(12) United States Patent
Tsang

(10) Patent No.: US 9,318,905 B2
(45) Date of Patent: Apr. 19, 2016

(54) WIRELESS OPTICAL CHARGING AND POWER SUPPLY

(71) Applicant: City University of Hong Kong, Kowloon, Hong Kong (CN)

(72) Inventor: Peter Wai Ming Tsang, Hong Kong (CN)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 442 days.

(21) Appl. No.: 13/673,128

(22) Filed: Nov. 9, 2012

(65) Prior Publication Data

US 2014/0132201 A1  May 15, 2014

(51) Int. Cl.
*H02J 7/00* (2006.01)
*H02J 7/02* (2006.01)
*H02J 17/00* (2006.01)

(52) U.S. Cl.
CPC ............... *H02J 7/0044* (2013.01); *H02J 7/025* (2013.01); *H02J 17/00* (2013.01); *Y02B 40/90* (2013.01)

(58) Field of Classification Search
CPC ....................................................... H02J 7/025
USPC ......................................................... 320/108
See application file for complete search history.

(56) References Cited

U.S. PATENT DOCUMENTS

| | | | |
|---|---|---|---|
| 6,707,274 B1 | 3/2004 | Karr | |
| 7,443,057 B2 | 10/2008 | Nunally | |
| 7,514,899 B2 * | 4/2009 | Deng-Peng | 320/101 |
| 7,772,802 B2 * | 8/2010 | Manico | H02J 7/025 320/106 |
| 7,888,908 B2 * | 2/2011 | Kuo | 320/108 |
| 7,944,171 B2 | 5/2011 | Yeh | |
| 7,948,209 B2 | 5/2011 | Jung | |
| 8,013,568 B2 | 9/2011 | Park et al. | |
| 8,024,012 B2 | 9/2011 | Clevenger et al. | |
| 8,054,037 B2 | 11/2011 | Nagatsuka et al. | |
| 8,067,921 B2 | 11/2011 | Sip et al. | |

* cited by examiner

*Primary Examiner* — Edward Tso
*Assistant Examiner* — Ahmed Omar
(74) *Attorney, Agent, or Firm* — Amin, Turocy & Watson, LLP

(57) ABSTRACT

Techniques for charging electronic devices are presented. A charger controller component controls supplying power to an electronic device having a solar cell component using optical charging. The charger controller component detects a shape and position of the electronic device located on a charger substrate component. The charger controller component identifies a subset of a plurality of light sources associated with the charger substrate component that correspond to the shape and position of the electronic device, and controls illumination of the light sources to illuminate the subset of light sources. The illumination of the subset of light sources provides optical waves to the electronic device that are converted to electrical energy to charge a power component of the electronic device. An optical processing element can employ an array of lenticular lens or microlens that can expand coverage of each light source and enhance uniformity of the illuminated area.

22 Claims, 11 Drawing Sheets

WIRELESS OPTICAL CHARGING AND POWER SUPPLY

TECHNICAL FIELD

The subject disclosure relates generally to power supplies, and in particular, to wireless optical charging and power supply.

BACKGROUND

With the rapid expansion of portable electronic devices, charging of batteries of these portable electronic devices has become a significant issue. While charging through cables or dockings can be somewhat effective, it can be inconvenient to carry and/or search for a suitable cable and charger for one or more portable electronic devices. Also, charging a portable electronic device in a public area can be problematic, as a charging platform in a public area may have to provide different charging resources and/or charging accommodations for various types of portable electronic devices, and may be expected to handle the charging requests of a large number of customers.

One solution can be to use a wireless charging infrastructure, wherein the charger may be in the form of a pad where a user can charge an electronic device by placing the device on a flat substrate. A large part of the development to date on wireless charging has been based on electromagnetic coupling. However, electromagnetic coupling has certain drawbacks as it may induce undesired interference to other electronic devices that may be sensitive to electromagnetic waves and/or or entities (e.g. hard drive, credit cards, etc.) that may be embedded with magnetic responsive substances. Also, when higher power is desired to supply a large charging area (e.g., a charging table), it is uncertain whether a large charging area using electromagnetic coupling will be hazardous to human health.

The above-described description is merely intended to provide a contextual overview of wireless and optical charging, and is not intended to be exhaustive.

SUMMARY

The following presents a simplified summary of various aspects of the disclosed subject matter in order to provide a basic understanding of some aspects described herein. This summary is not an extensive overview of the disclosed subject matter. It is intended to neither identify key or critical elements of the disclosed subject matter nor delineate the scope of such aspects. Its sole purpose is to present some concepts of the disclosed subject matter in a simplified form as a prelude to the more detailed description that is presented later.

Systems, methods, computer readable storage mediums, and techniques disclosed herein relate to charging electronic devices. Disclosed herein is a system comprising at least one memory that stores computer executable components, and at least one processor that facilitates execution of the computer executable components stored in the at least one memory. The computer executable components comprising a detector component that detects an electronic device in response to the electronic device being in proximity to a charger substrate component of a charger component. The computer executable components also including a charger controller component that identifies a charging coverage area of the charger substrate component that corresponds to at least a location of the electronic device in relation to the charger substrate component and controls a set of light sources of the charger component to facilitate illumination of a subset of light sources of the set of light sources, based at least in part on the location of the electronic device in relation to the charger substrate component, to facilitate charging or powering the electronic device.

Also disclosed herein is a method that includes detecting, by a system including a processor, an electronic device in response to the electronic device being in proximity to a charger substrate component of a charger component. The method also includes controlling, by the system, a set of light sources to facilitate illuminating a subset of light sources of the set of light sources associated with a charging coverage area of the charger substrate component that corresponds to a location of the electronic device in relation to the charger substrate component, based at least in part on the location of the electronic device in relation to the charger substrate component, to facilitate charging or powering the electronic device.

Further disclosed herein is a non-transitory computer readable storage medium comprising computer executable instructions that, in response to execution, cause a system including a processor to perform operations. The operations include sensing an electronic device in response to the electronic device being in proximity to a charger substrate component of a charger component. The operations also include controlling a set of light sources to facilitate illuminating a subset of light sources of the set of light sources associated with a charging coverage area of the charger substrate component that is associated with a location of the electronic device in relation to the charger substrate component, based at least in part on the location of the electronic device in relation to the charger substrate component, to facilitate charging or powering the electronic device.

The disclosed subject matter also includes a system comprising means for detecting an electronic device in response to the electronic device being in proximity to a charger substrate component of a charger component. The system also includes means for controlling a set of light sources to facilitate illuminating a subset of light sources of the set of light sources associated with a charging coverage area of the charger substrate component that corresponds to a location of the electronic device in relation to the charger substrate component, based at least in part on the location of the electronic device in relation to the charger substrate component, to facilitate charging or powering the electronic device.

The following description and the annexed drawings set forth in detail certain illustrative aspects of the disclosed subject matter. These aspects are indicative, however, of but a few of the various ways in which the principles of the disclosed subject matter may be employed, and the disclosed subject matter is intended to include all such aspects and their equivalents. Other advantages and distinctive features of the disclosed subject matter will become apparent from the following detailed description of the disclosed subject matter when considered in conjunction with the drawings.

DETAILED DESCRIPTION

Figure 1:
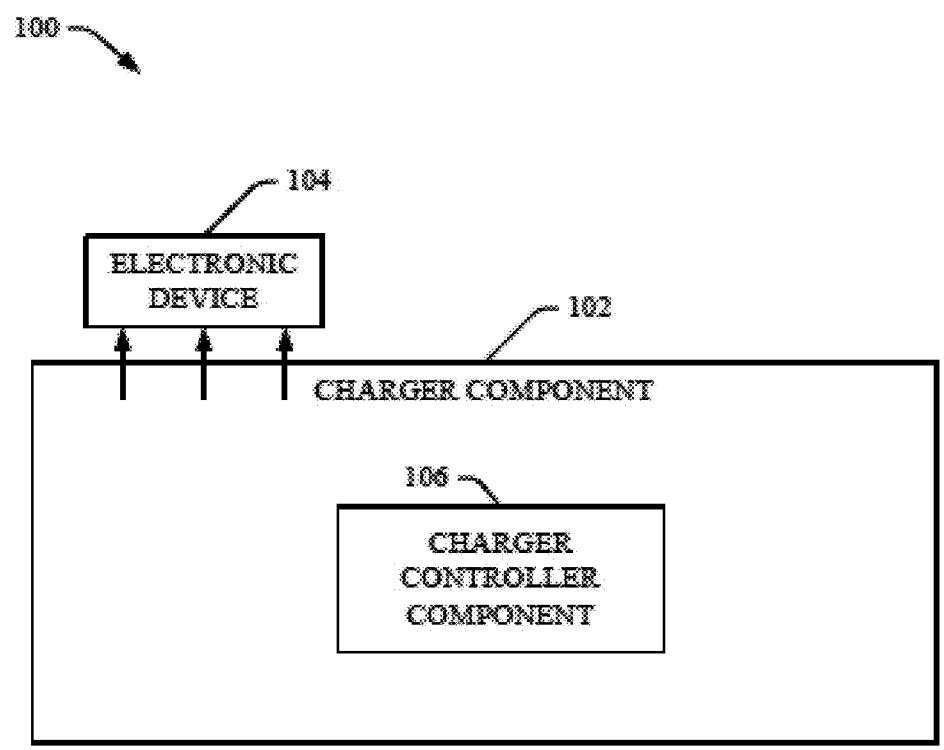
FIG. 1 illustrates a block diagram of an example system that can efficiently charge (e.g., wirelessly charge) electronic devices (e.g., portable electronic devices), in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

With the rapid expansion of portable electronic devices, charging of batteries of these portable electronic devices has become a significant issue. While charging through cables or dockings can be somewhat effective, it can be inconvenient to carry and/or search for a suitable cable and charger for one or more portable electronic devices. Also, charging a portable electronic device in a public area can be problematic, as a charging platform in a public area may have to provide different charging resources and/or charging accommodations for various types of portable electronic devices, and may be expected to handle the charging requests of a large number of customers.

One technique that can be used to charge portable electronic devices is a wireless charging infrastructure, wherein the charger may be in the form of a pad, and a user can charge an electronic device by placing the device on a flat substrate. Conventionally, a large part of the development on wireless charging has been based on electromagnetic coupling. However, electromagnetic coupling has certain drawbacks as it may induce undesired interference to other electronic devices that may be sensitive to electromagnetic waves and/or or entities (e.g. hard drive, credit cards, etc.) that may be embedded with magnetic responsive substances. Also, when higher power is desired to supply a large charging area (e.g., a charging table), it is uncertain whether a large charging area using electromagnetic coupling will be hazardous to human health.

There is an increasing trend towards equipping electronic devices (e.g., portable electronic devices) with solar panels that can be used to facilitate charging those electronic devices. Some potential issues with relying on solar panels for charging electronic devices can be that solar panels can be dependent on the availability of sunshine or a brightly lit indoor environment.

To that end, techniques for charging electronic devices are presented. A charger component can supply power to electronic devices placed in proximity to (e.g., placed on or at least near) a charger substrate component of the charger component. The charger substrate component can be a substrate (e.g., plate) that can be formed of a transparent material, such as, for example, glass or plastic, to facilitate allowing optical waves to pass through the charger substrate component.

The charger component can include a light source component that can comprise a plurality of light sources (e.g., light-emitting diodes (LEDs), light bulbs, etc.) that can be illuminated, in a controlled manner, to provide (e.g., emit or transmit) optical waves to the electronic devices associated with (e.g., in proximity to) the charger component. The light sources of the light source component can be arranged as a one-dimensional or multiple-dimensional array of light sources. The light source component can illuminate the light sources at the same wavelength or different wavelengths to correspond to the respective characteristics of the solar cell components on different target electronic devices.

The solar cell components of the electronic devices can receive the optical waves from the charger component via the charger substrate component. A solar cell component can include a solar panel(s) and/or other components and circuitry that can convert optical waves to electrical energy that can be used to power an associated electronic device. The respective solar cell components of the respective electronic devices can convert the optical waves to electrical energy that can be used by the respective electronic devices to charge their power sources (e.g., power component, such as a rechargeable battery) or otherwise supply power to the electronic devices to facilitate operation of the electronic devices.

In some implementations, the charger component can comprise an optical processor component that can enhance operation of the charger component. The optical processor component can utilize a holographic and/or optical means to facilitate processing an optical wavefront associated with the light source component to facilitate providing more efficient distribution of optical waves and conversion of optical waves to electrical energy. In some implementations, the optical processor component can employ an array of lenticular lens or microlens that can expand coverage of each light source of the light source component and enhance uniformity of the illuminated area of the charger substrate component. This can allow the spacing between adjacent light sources to be increased and the number of light sources employed by the light source component to be reduced, as compared to the light-source spacing and the number of light sources that would otherwise be employed without the optical processor component. The optical processor component can thereby facilitate more efficient charging of the electronic devices associated with the charger component.

The charger component also can include a charger controller component that can control operations associated with the charger component and the supplying of power to an electronic device. The charger controller component can include or be associated with (e.g., be communicatively connected to) a detector component that can sense or detect a shape, position, and/or location of the electronic device in relation to the charger substrate component. For instance, the detector component can sense an electronic device in proximity to the charger component and can capture an image or other representative information of the electronic device. The detector component can be, for example, a digital camera, a sensor, or other device that can sense or detect an object, such as an electronic device. The charger controller component can be, or can be associated with (e.g., can be part of or utilized by), a computer, a processor, a microcontroller, or another hardware device (e.g., an application-specific integrated circuit (ASIC)) having information computing or processing functionality. The charger controller component can employ a defined charging control algorithm that can facilitate controlling operations (e.g., analyzing information relating to the charging of electronic devices; identifying the type, brand, presence, size, shape, position, and/or location of an electronic device; controlling illumination and/or wavelength of light sources to facilitate charging an electronic device; etc.) and components associated with the charger component. Based at least in part on the captured image or other representative information of the electronic device, the charger controller component can identify the shape, position, and/or location of the electronic device in relation to the charger substrate component. With regard to the type or brand of the electronic device, the electronic device can contain a tag (e.g., radio frequency identification (RFID) tag or other type of tag) or code (e.g., barcode, quick response (QR) code, or other type of code), and the detector component can detect the tag or code, and can identify the type and/or brand of the electronic device based at least in part on the tag or code.

In response to identifying the size, shape, position, and/or location of the electronic device in relation to the charger substrate component, and/or the type or brand of the electronic device, the charger controller component can identify a subset of a plurality of light sources associated with the charger substrate component that can correspond to the shape, position, and/or location of the electronic device in relation to the charger substrate component, and can control illumination of the light sources to illuminate the subset of light sources, without having to illuminate other light sources that are not sufficiently proximate to the electronic device. In other implementations, the charger controller component can receive information manually (e.g., through finger(s) and/or a pointing instrument, mechanism, component, implement, etc.) to facilitate identification of a subset of the plurality of light sources associated with the charger substrate component that can correspond to the shape, position, and/or location of the electronic device in relation to the charger substrate component. For example, a transparent sensor component (e.g., a transparent layer comprising touch sensing functionality and/or an array of sensors) can be overlaid onto the charger substrate component, and a user can touch (e.g., using a finger(s) or other selecting mechanism (e.g., stylus or pen)) the region of the charger substrate component that is to be illuminated to facilitate charging the electronic device when the device is placed on the charger substrate component. In certain implementations, the charger component can include an interface that can receive (e.g., manually receive) information from the user regarding, for example, the type, brand, size, shape, location, etc., of the electronic device and/or other information relating to the electronic device to facilitate charging of the electronic device by the charger component. The charger controller component can identify the subset of a plurality of light sources associated with the charger substrate component, based at least in part on information received manually, and can control illumination of the light sources to illuminate the subset of light sources, without having to illuminate other light sources that are not sufficiently proximate to the electronic device.

Based at least in part on the identification of the size, shape, position, and/or location of the electronic device in relation to the charger substrate component, and/or the type or brand of the electronic device, the charger controller component can control operations of the light source component to only illuminate light sources (e.g., the subset of light sources) that are in or nearby the region of the light source array that corresponds to the area of the charger substrate component occupied by the electronic device to be charged via the charger component. The charger controller component can thereby control or adapt the illumination of the light sources in relation to the various shapes, positions, and/or locations of various electronic devices, and/or areas of the charger substrate component specified manually through received information, to facilitate distributing optical waves in an intelligent and efficient manner. By controlling which light sources are illuminated at a given time to facilitate charging the electronic device, the charger component can save energy and avoid unnecessary light contamination to the surrounding environment.

The illumination of the subset of light sources can provide (e.g., emit or transmit) optical waves to the solar cell component of the electronic device. The solar cell component can receive those optical waves and can convert the optical waves to electrical energy to facilitate charging a power component of the electronic device and/or otherwise providing power to the electronic device.

In accordance with various implementations, the disclosed subject matter can adapt the charger component for use on virtually any desired scale from a smaller scale (e.g., a relatively small pad that takes up a portion of a table top) to a larger scale (e.g., a table of desired size). In some implementations, the charger component also can include various other types of interfaces (e.g., plugs, connectors, wiring, etc.) to facilitate directly supplying power to target electronic devices.

FIG. 1 illustrates a block diagram of an example system 100 that can efficiently charge (e.g., wirelessly charge) electronic devices (e.g., portable electronic devices), in accordance with various aspects and embodiments of the disclosed subject matter. In an aspect, the system 100 can include a charger component 102 that can use optical waves to facilitate supplying power to electronic devices, such as an electronic device 104, placed in proximity to (e.g., placed on or at least near) a surface (e.g., a surface of a charger substrate component) of the charger component 102.

Figure 2:
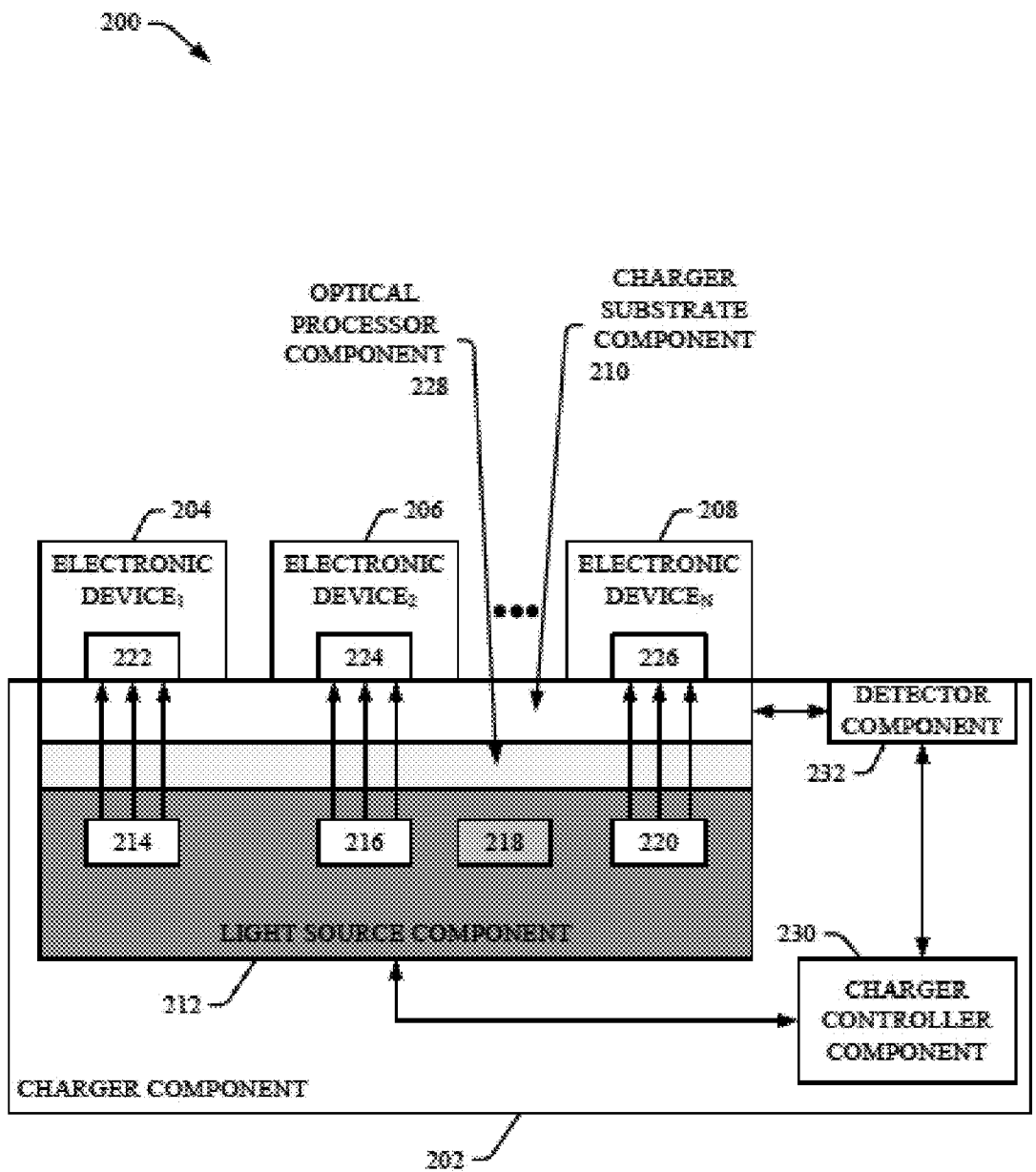
FIG. 2 depicts a block diagram of an example system that can efficiently charge electronic devices, in accordance with various aspects and embodiments of the disclosed subject matter.
Figure 4:
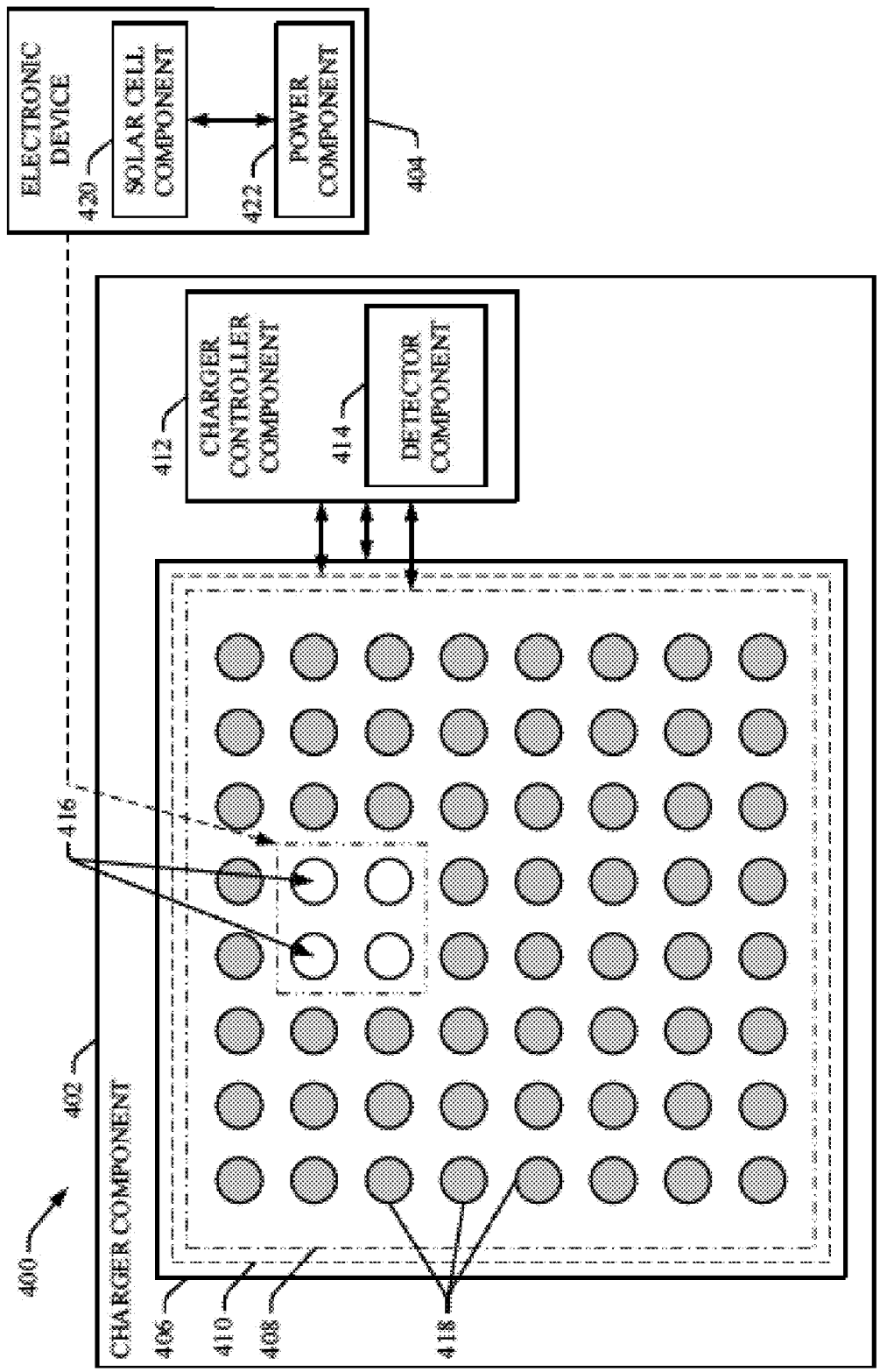
FIG. 4 presents a top-view diagram of an example system that can efficiently provide optical waves to facilitate charging an electronic device, in accordance with various aspects and embodiments of the disclosed subject matter.

The charger component 102 can emit optical waves that can be received by the electronic device 104. The electronic device 104 can receive the optical waves (e.g., using a solar cell component that is not shown in FIG. 1; e.g., as shown in FIG. 2 and disclosed herein) and can convert the optical waves to electrical energy that can be used by the electronic device 104 to charge its power source (e.g., a power component that is not shown in FIG. 1; e.g., as shown in FIG. 4 and disclosed herein) or otherwise supply power to the electronic device 104 to facilitate operation of the electronic device 104.

The charger component 102 can include a charger controller component 106 that can control operations of the charger component 102 to facilitate charging the electronic devices, including electronic device 104. For instance, in response to the electronic device 104 being placed on or near the surface (e.g., charging surface) of the charger component 102, the charger component 102 can detect the presence, size, shape, position, and/or location of the electronic device 104 in relation to the charger component 102, and/or the type or brand of the electronic device 104. The charger controller component 106 can identify the size, shape, position, and/or location of the electronic device 104 in relation to the charger component 102 (e.g., the charger substrate component of the charger component 102), and/or the type or brand of the electronic device 104, based at least in part on information relating to the detection of the electronic device 104 by the charger component 102. With regard to the type or brand of the electronic device, the electronic device 104 can contain, for example, a tag (e.g., RFID tag or other type of tag) or code (e.g., barcode, QR code, or other type of code), and the charger component 102 (e.g., using a detector component) can detect the tag or code associated with the electronic device 104, and can identify the type and/or brand of the electronic device 104 based at least in part on the tag or code.

In response to identifying the size, shape, position, and/or location of the electronic device 104 in relation to the charger component 102, and/or the type or brand of the electronic device 104, the charger controller component 106 can control illumination of light sources of the charger component 102 to illuminate only the area (and/or a nearby area proximate to the area) of the charger component 102 that corresponds or substantially corresponds to the size, shape, position, and/or location of the electronic device 104 in relation to the charger component 102, without having to illuminate other portions of the charger substrate component of the charger component 102. The optical waves from the illuminated light sources can be provided to the electronic device 104 to facilitate charging the electronic device 104 or otherwise supplying power to the electronic device 104.

In some implementations, the charger component 102 can process the optical waves being distributed by the charger component 102 to expand coverage of each light source of the charger component 102 and enhance uniformity of the illuminated area of the charger component 102, as more fully disclosed herein. As a result, the charger component 102 can facilitate charging electronic devices, such as electronic device 104, more efficiently.

Turning to FIG. 2, depicted is a block diagram of an example system 200 that can efficiently charge (e.g., wirelessly charge) electronic devices (e.g., portable electronic devices), in accordance with various aspects and embodiments of the disclosed subject matter. The system 200 can include a charger component 202 that can generate and provide optical waves to one or more electronic devices, such as, for example, electronic device$_1$ 204, electronic device$_2$ 206, and/or electronic device$_N$ 208, to facilitate supplying power to the electronic devices (e.g., 204, 206, and/or 208) that can be placed in proximity to (e.g., placed on or at least near) a charger substrate component 210 of the charger component 202, wherein N can be virtually any desired integer number. The charger substrate component 210 can be a substrate (e.g., plate) that can be formed of a transparent material, such as, for example, glass or plastic, to facilitate allowing optical waves to pass through the charger substrate component 210 to the one or more electronic devices (e.g., 204, 206, and/or 208) associated with (e.g., placed in proximity to) the charger component 202.

The charger component 202 can include a light source component 212 that can comprise a plurality of light sources (e.g., LEDs, light bulbs, etc.), including, for example, light source$_1$ 214, light source$_2$ 216, light source$_3$ 218, and/or light source$_M$ 220, that can be illuminated, in a controlled manner, to provide (e.g., emit or transmit) optical waves to the electronic devices (e.g., 204, 206, and/or 208) associated with (e.g., in proximity to) the charger component 202, wherein M can be virtually any desired integer number. The light sources 214, 216, 218, and/or 220) of the light source component 212 can be arranged as a one-dimensional or multiple-dimensional array of light sources. The light source component 212 can illuminate respective light sources 214, 216, 218, and/or 220), which are to be illuminated, at the same wavelength or at different wavelengths to correspond to the respective characteristics of the solar cell components (e.g., 222, 224, and/or 226) of different target electronic devices (e.g., 204, 206, and/or 208).

A solar cell component(s) (e.g., 222, 224, or 226) of an electronic device(s) (e.g., 204, 206, and/or 208) when placed in proximity to the charger substrate component 210 can receive the optical waves from the charger component 202 via the charger substrate component 210. A solar cell component (e.g., 222) can include a solar panel(s) and/or other components and circuitry that can convert optical waves to electrical energy that can be used to power an associated electronic device (e.g., 204). A solar cell component(s) (e.g., 222, 224, or 226) of the electronic device(s) (e.g., 204, 206, and/or 208) can convert the optical waves to electrical energy (e.g., power) that can be used by the electronic device(s) (e.g., 204, 206, and/or 208) to charge its or their power source(s) (e.g., power component(s), such as a rechargeable battery(ies)) or otherwise supply power to the electronic device(s) (e.g., 204, 206, and/or 208) to facilitate operation of the electronic device(s) (e.g., 204, 206, and/or 208).

In some implementations, the charger component 202 can comprise an optical processor component 228 that can enhance operation of the charger component 202 to more efficiently provide optical waves to an electronic device(s) (e.g., 204, 206, and/or 208) being charged by the charger component 202. The optical processor component 228 can utilize a holographic and/or an optical means (e.g., static or dynamic optical and/or holographic devices) to facilitate processing an optical wavefront associated with the light source component 212 to facilitate providing more efficient distribution of optical waves and conversion of optical waves to electrical energy. The processing of the optical wavefront by the optical processor component 228 can increase the efficiency of the optical to electrical energy conversion. In some implementations, the optical processor component 228 can employ an array of lenticular lens or microlens that can expand or direct coverage of each light source (e.g., 214, 216, 218, 220, etc.) of the light source component 212 and enhance uniformity of the illuminated area (e.g., charging coverage area) of the charger substrate component 210. This can allow the spacing between adjacent light sources (e.g., 214, 216, 218, 220, etc.) to be increased and the number of light sources (e.g., 214, 216, 218, 220, etc.) employed by the light source component 212 to be reduced, as compared to the light-source spacing and the number of light sources that would otherwise be employed without the optical processor component 228. The optical processor component 228 can thereby facilitate more efficient charging of the electronic devices (e.g., 204, 206, and/or 208) associated with the charger component 202.

The charger component 202 also can include a charger controller component 230 that can control operations associated with the charger component 202 and the supplying of power to an electronic device(s) (e.g., 204, 206, and/or 208) associated with the charger component 202. The charger controller component 230 can include or be associated with (e.g., be communicatively connected to) a detector component 232 that can sense or detect a presence, size, shape, position, and/or location of an electronic device(s) (e.g., 204, 206, and/or 208) in relation to the charger substrate component 210, and/or can sense or detect the type or brand of the electronic device(s) (e.g., 204, 206, and/or 208). For instance, the detector component 232 can sense an electronic device 204 in proximity to the charger substrate component 210 and can capture an image or other representative information of the electronic device 204. The detector component 232 can be, for example, a digital camera, a sensor component, or other device that can sense or detect an object, such as the electronic device(s) (e.g., 204, 206, and/or 208), and/or other information associated with the object. In some implementations, the detector component 232 can comprise a camera that can detect and capture an image of the electronic device 204 in relation to the charger substrate component 210 to facilitate identifying the size, shape, position, location, type, and/or brand, etc., of the electronic device 204. In certain implementations, the detector component 232 can, for example, comprise a sensor component that can comprise one or more sensors (e.g., a sensor array) that can sense or detect the presence, size, shape, and/or location of an electronic device 204 (e.g., in relation to the charger substrate component 210) when it is placed on the charger substrate component 210.

The charger controller component 230 can be, or can be associated with (e.g., can be part of or utilized by), a computer, a processor, a microcontroller, or another hardware device (e.g., ASIC) having information computing or processing functionality. The charger controller component 230 can employ a defined charging control algorithm that can facilitate controlling operations (e.g., analyzing information relating to the charging of electronic devices (e.g., 204, 206, and/or 208); identifying the type, brand, presence, size, shape, position, and/or location of an electronic device(s) (e.g., 204, 206, and/or 208); identifying a charging coverage area of the charger substrate component 210; controlling illumination and/or wavelength of light sources (e.g., 214, 216, 218, 220, etc.) to facilitate charging an electronic device(s) (e.g., 204, 206, and/or 208); etc.) and components associated with the charger component 202. Based at least in part on the captured image or other representative information associated with the electronic device 204, the charger controller component 230 can identify the size, shape, position, and/or location of the electronic device 204 in relation to the charger substrate component 210, and/or can identify the type or brand of the electronic device 204.

In response to identifying the shape, position, and/or location of the electronic device 204 in relation to the charger substrate component 210, and/or the type or brand of the electronic device 204, the charger controller component 230 can identify a charging coverage area of the charger substrate component 210 and/or a subset of a plurality of light sources (e.g., 214, 216, 218, 220, etc.) associated with the charger substrate component 210 that can correspond to the size, shape, position, and/or location of the electronic device 204 in relation to the charger substrate component 210, and/or can correspond to the type or brand of the electronic device 204, and can control illumination of the light sources (e.g., 214, 216, 218, 220, etc.) to illuminate the subset of light sources of the light source component 212, without having to illuminate other light sources of the light source component 212 that are not sufficiently proximate to the electronic device 204. For instance, the charger controller component 230 can control operations of the light source component 212 to only illuminate light sources (e.g., the subset of light sources) that are in or nearby the region of the light source array that corresponds to the area (e.g., charging coverage area) of the charger substrate component 210 occupied by the electronic device to be charged via the charger component 202. The charger controller component 230 can thereby control or adapt the illumination of the light sources (e.g., 214, 216, 218, 220, etc.) of the light source component 212 in relation to the various types, brands, sizes, shapes, positions, and/or locations of one or more various electronic devices (e.g., 204, 206, and/or 208) to facilitate distributing optical waves to the one or more various electronic devices (e.g., 204, 206, and/or 208) in an intelligent and efficient manner. By controlling which light sources (e.g., 214, 216, 218, 220, etc.) of the light source component 212 are illuminated at a given time to facilitate charging the one or more various electronic devices (e.g., 204, 206, and/or 208), the charger component 202 can save energy and avoid unnecessary light contamination to the surrounding environment.

The illumination of the subset of light sources of the light source component 212 can provide (e.g., emit) optical waves to a solar cell component(s) (e.g., 222, 224, and/or 226) of an electronic device(s) (e.g., 204, 206, and/or 208). The solar cell component(s) (e.g., 222, 224, and/or 226) can receive the optical waves and can convert the optical waves to electrical energy to facilitate charging a power component(s) of the electronic device(s) (e.g., 204, 206, and/or 208) and/or otherwise providing power to the electronic device(s) (e.g., 204, 206, and/or 208).

In some implementations, in addition to or as an alternative to other implementations disclosed herein, the charger substrate component 210 can include or have overlaid thereon a sensor component (e.g., transparent sensor plate, layer, or interface comprising touch sensing functionality and/or an array of sensors) (not shown in FIG. 2) and/or graphical user interface (GUI) (not shown in FIG. 2) that can receive, for example, through a pointing or selection implementation (e.g., through finger(s), pen, stylus, or other pointing or selection instrument, mechanism, component, implement, etc.), information manually (e.g., from a user) to facilitate identifying, detecting, or selecting portions of the charging area associated with the charger substrate component 210 (e.g., detecting or selecting light sources associated with the portions of the charging area) for illumination to facilitate charging of an electronic device(s) (e.g., 204, 206, and/or 208) placed in proximity to (e.g., placed on or at least near) the charger substrate component 210. In certain implementations, the charger component 202 can include an interface (not shown in FIG. 2) that can receive (e.g., manually receive) information from the user regarding, for example, the type, brand, size, etc., of an electronic device (e.g., 204, 206, or 208) and/or other information relating to the electronic device to facilitate charging of the electronic device by the charger component 202.

In accordance with various implementations, the disclosed subject matter can adapt the charger component 202 for use on virtually any desired scale from a smaller scale (e.g., a relatively small pad that takes up a portion of a table top) to a larger scale (e.g., a table of desired size). In some implementations, the charger component 202 also can include various other types of interfaces (e.g., plugs, connectors, wiring, etc.) to facilitate directly supplying power to target electronic devices (e.g., 204, 206, and/or 208). The disclosed subject matter, by employing the charger component 202 that controls the use of optical waves to facilitate charging electronic devices, can charge electronic devices without producing an undesirable amount of electromagnetic and/or magnetic interference that can negatively effect mobile devices, hard drives, magnetic ID cards, etc., in contrast to some conventional device chargers (e.g., device chargers that charge devices using an electromagnetic process). The disclosed subject matter, by employing the charger component 202, can support a relatively large charging and power supply area without electromagnetic hazards to human health, and can be a more economical solution for charging electronic devices than electromagnetic chargers, particularly for larger charging and supply areas.

System 100, system 200, and/or other systems, methods, devices, processes, techniques, etc., of the disclosed subject matter can employ a wireless charging and power supply platform (e.g., comprising the charger component) for a variety of electronic devices, including electronic devices respectively equipped with a solar cell component, power supply, and/or charger. The electronic devices and/or applications can include, for example, various types of mobile phones, electronic tablets, audio systems (e.g., desktop audio systems), computer (e.g., laptop computer), and/or various types of solar panels and/or solar chargers.

Figure 3:
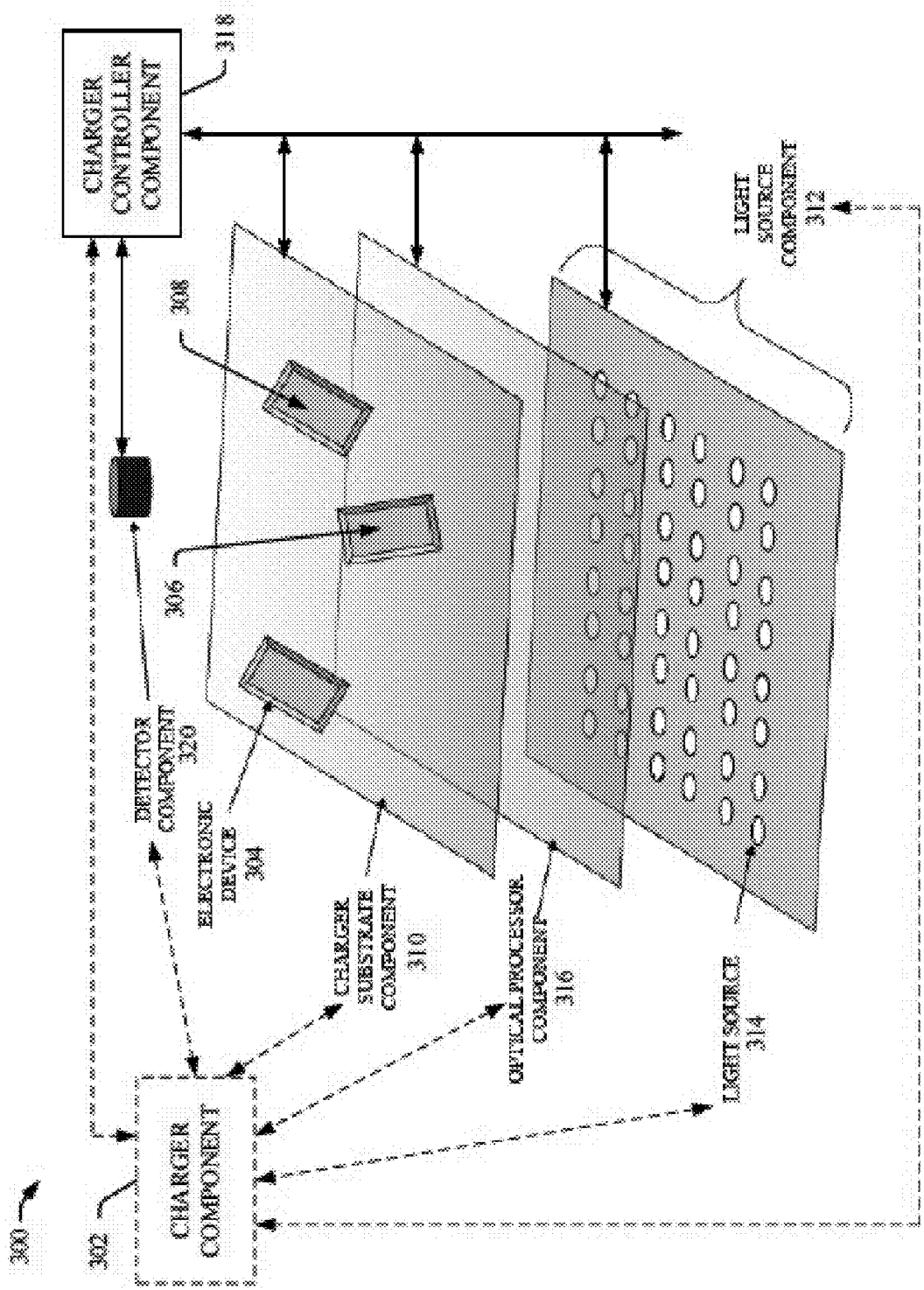
FIG. 3 illustrates a diagram of an example system that can charge electronic devices, in accordance with various aspects and embodiments of the disclosed subject matter.

FIG. 3 illustrates a diagram of an example system 300 that can charge electronic devices, in accordance with various aspects and embodiments of the disclosed subject matter. The system 300 can include a charger component 302 that can generate and provide optical waves to one or more electronic devices, such as, for example, electronic device$_1$ 304, electronic device$_2$ 306, and/or electronic device$_N$ 308, to facilitate supplying power to the electronic devices (e.g., 304, 306, and/or 308) that can be placed in proximity to (e.g., placed on or at least near) a charger substrate component 310 of the charger component 302, wherein N can be virtually any desired integer number. The charger substrate component 310 can be a substrate that can be formed of a transparent material, such as, for example, glass or plastic, to facilitate allowing optical waves to pass through the charger substrate component 310 to the one or more electronic devices (e.g., 304, 306, and/or 308) associated with (e.g., placed in proximity to) the charger component 302.

The charger component 302 can include a light source component 312 that can comprise a plurality of light sources 314 (e.g., LEDs, light bulbs, etc.) that can be illuminated, in a controlled manner, to provide (e.g., emit) optical waves to the electronic devices (e.g., 304, 306, and/or 308) associated with (e.g., in proximity to) the charger component 302. The light source component 312 can illuminate respective light sources 314, which are to be illuminated, at the same wavelength or at different wavelengths to correspond to the respective characteristics of the solar cell components of different target electronic devices (e.g., 304, 306, and/or 308).

The charger component 302 also can comprise an optical processor component 316 that can enhance operation of the charger component 302 to more efficiently provide optical waves to an electronic device(s) (e.g., 304, 306, and/or 308) being charged by the charger component 302, as more fully disclosed herein. The charger component 302 further can include a charger controller component 318 that can control operations associated with the charger component 302 and the supplying of power to an electronic device(s) (e.g., 304, 306, and/or 308) associated with the charger component 302, as more fully disclosed herein. The charger controller component 318 can include or be associated with (e.g., be communicatively connected to) a detector component 320 that can sense or detect a presence, size, shape, position, and/or location of an electronic device(s) (e.g., 304, 306, and/or 308) in relation to the charger substrate component 310, and/or can sense or detect the type or brand of the electronic device(s) (e.g., 304, 306, and/or 308).

Based at least in part information (e.g., captured image or other representative information associated with an electronic device) obtained by the detector component 320 from sensing or detecting of an electronic device(s) (e.g., 304, 306, and/or 308) in proximity to the charger substrate component 310, the charger controller component 318 can identify the size, shape, position, and/or location of the electronic device(s) (e.g., 304, 306, and/or 308) in relation to the charger substrate component 310. In response to identifying the size, shape, position, and/or location of the electronic device(s) (e.g., 304, 306, and/or 308) in relation to the charger substrate component 310, and/or identifying the type or brand of the electronic device(s) (e.g., 304, 306, and/or 308), the charger controller component 318 can identify a charging coverage area of the charger substrate component 310 and/or a subset of a plurality of light sources 314 associated with the charger substrate component 310 that correspond to the size, shape, position, and/or location of the electronic device(s) (e.g., 304, 306, and/or 308) in relation to the charger substrate component 310, and can control illumination of the light sources 314 to illuminate the subset of light sources 314 of the light source component 312 and thereby illuminate the charging coverage area of the charger substrate component 310, without having to illuminate other light sources 314 of the light source component 312 that are not sufficiently proximate to the electronic device(s) (e.g., 304, 306, and/or 308).

FIG. 4 presents a top-view diagram of an example system 400 that can efficiently provide optical waves to facilitate charging an electronic device, in accordance with various aspects and embodiments of the disclosed subject matter. The system 400 can include a charger component 402 that can generate and provide optical waves to one or more electronic devices, such as, for example, electronic device 404, to facilitate supplying power to the electronic device 404 when an electronic device 404 is placed in proximity to (e.g., placed on or at least near) a charger substrate component 406 of the charger component 402.

The charger component 402 can comprise a light source component 408 that can comprise a plurality of light sources (e.g., LEDs, light bulbs, etc.) that can be illuminated, in a controlled manner, to provide (e.g., emit) optical waves to the electronic device 404 associated with (e.g., in proximity to) the charger component 402. The charger component 402 also can contain an optical processor component 410 that can enhance operation of the charger component 402 to more efficiently provide optical waves to the electronic device 404 being charged by the charger component 402, as more fully disclosed herein.

The charger component 402 further can include a charger controller component 412 that can control operations associated with the charger component 402 and the supplying of power to the electronic device 404 associated with the charger component 402, as more fully disclosed herein. The charger controller component 412 can include or be associated with (e.g., be communicatively connected to) a detector component 414 that can sense or detect a presence, size, shape, position, and/or location of the electronic device 404 in relation to the charger substrate component 406, and/or can sense or detect the type or brand of the electronic device 404.

When the electronic device 404 is placed on or at least in proximity to the charger substrate component 406, the detector component 414 can sense or detect that presence of the electronic device 404 on or within the range of the charger substrate component 406. The detector component 414 also can sense or detect the size, shape, position, and/or location of the electronic device 404 in relation to the charger substrate component 406, and/or can sense or detect the type or brand of the electronic device 404. For instance, the detector component 414 (e.g., comprising a camera and/or sensor) can sense an electronic device 404 in proximity to the charger substrate component 406 and can capture an image or other representative information of the electronic device 404.

The charger controller component 412 can employ the defined charging control algorithm that can facilitate controlling operations (e.g., analyzing information relating to the charging of an electronic device(s) 404; identifying the presence, size, shape, position, location, type, and/or brand of an electronic device(s) 404; identify a wavelength or other characteristics associated with the electronic device 404; controlling illumination and/or wavelength of light sources (to facilitate charging an electronic device(s) 404); etc.) and components associated with the charger component 402. Based at least in part on the captured image or other representative information associated with the electronic device 404, the charger controller component 412 can identify the size, shape, position, and/or location of the electronic device in relation to the charger substrate component 406, and/or can identify the type or brand of the electronic device 404.

In response to identifying the size, shape, position, and/or location of the electronic device 404 in relation to the charger substrate component 406, and/or identifying the type or brand of the electronic device 404, the charger controller component 412 can identify a charging coverage area of the charger substrate component 406 and/or a subset of light sources of the light source component 408 that correspond or at least substantially correspond to the size, shape, position, location, type, and/or brand, etc., of the electronic device 404 in relation to the charger substrate component 406, and can control illumination of the light sources to illuminate the subset of light sources 416 of the light source component 408, without having to illuminate other light sources (e.g., light sources 418) of the light source component 408 that are not sufficiently proximate to the electronic device 404. For instance, the charger controller component 412 can control operations of the light source component 408 to only illuminate light sources (e.g., the subset of light sources 416) that are in or nearby the region of the light source array that corresponds or at least substantially corresponds to the area (e.g., charging coverage area) of the charger substrate component 406 occupied by the electronic device 404 to be charged via the charger component 402. The charger controller component 412 can thereby control or adapt the illumination of the light sources of the light source component 408 (e.g., to illuminate certain light sources 416, or maintain or switch light resources 418 to an off or non-illuminated state) in relation to the various sizes, shapes, positions, and/or locations of one or more various electronic devices (e.g., electronic device 404) to facilitate distributing optical waves to the one or more various electronic devices (e.g., electronic device 404) in an intelligent and efficient manner. By controlling which light sources (e.g., 416) of the light source component 408 are illuminated at a given time to facilitate charging the one or more various electronic devices (e.g., electronic device 404), the charger component 402 can save energy and avoid unnecessary light contamination to the surrounding environment.

In some implementations, the charger controller component 412 can identify a light wavelength that can be used to desirably (e.g., optimally) charge the electronic device 404, based at least in part on information (e.g., characteristics associated with the solar cell component of the electronic device 404) obtained (e.g., captured or received) by the detector component 414 in relation to the electronic device 404. The charger controller component 412 can control illumination of the subset of light sources 416 of the light source component 408 such that the subset of light sources 416 are illuminated at a wavelength that corresponds or at least substantially corresponds to the identified light wavelength associated with the characteristics of the solar cell component of the target electronic device 404.

The illumination of the subset of light sources 416 of the light source component 408 can provide optical waves to a solar cell component 420 of the electronic device 404 via the optical processor component 410 and charger substrate component 406. The solar cell component 420 of the electronic device 404 can receive the optical waves and can convert the optical waves to electrical energy to facilitate charging a power component 422 (e.g., rechargeable battery) of the electronic device 404 and/or otherwise providing power to the electronic device 404.

Figure 5:
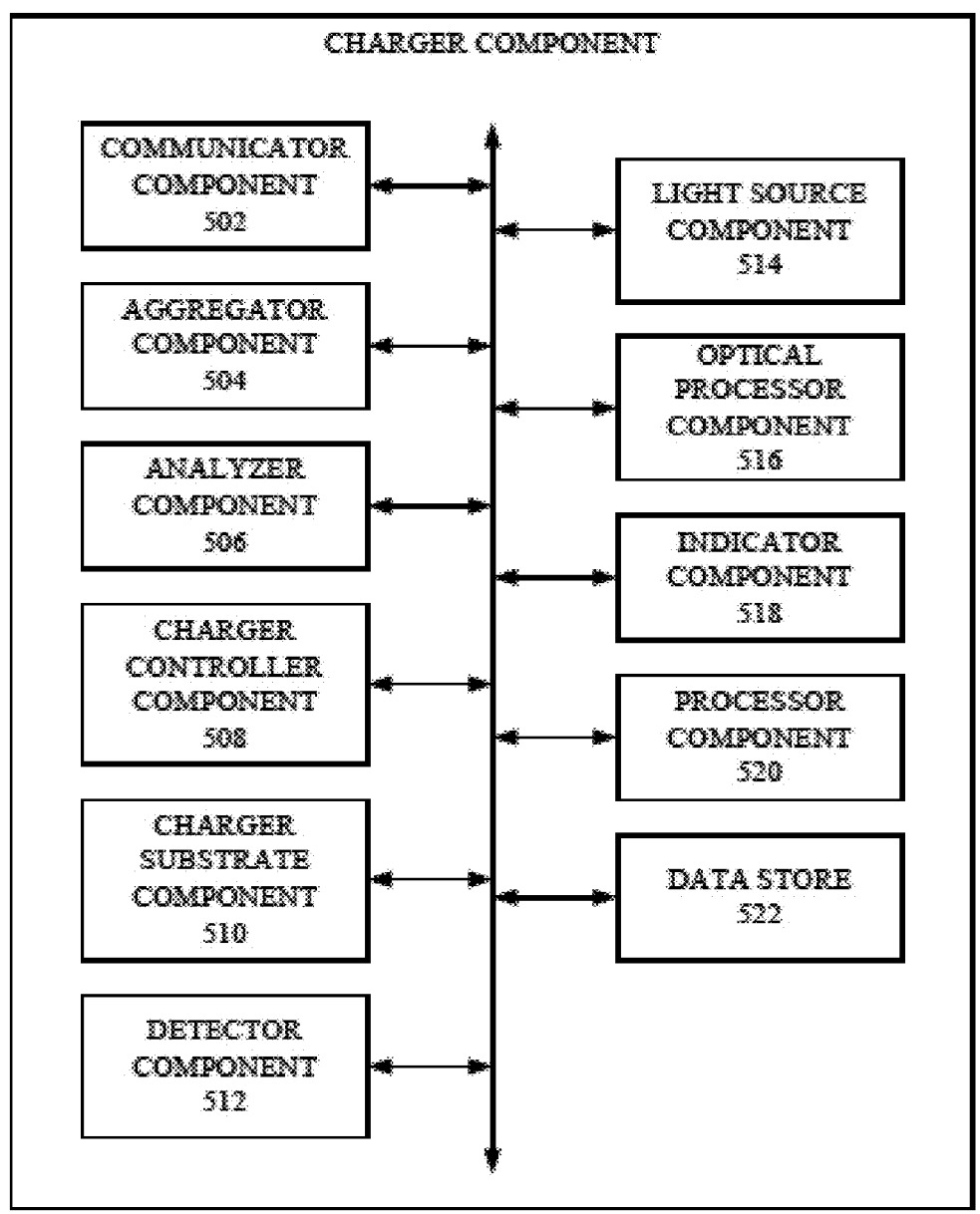
FIG. 5 illustrates a block diagram of an example charger component that can efficiently charge electronic devices, in accordance with various aspects and implementations of the disclosed subject matter.

FIG. 5 illustrates a block diagram of an example charger component 500 that can efficiently charge electronic devices, in accordance with various aspects and implementations of the disclosed subject matter. The charger component 500 can include a communicator component 502 that can be used to communicate (e.g., emit, transmit, receive) information, waves, etc., between the charger component 500 and other components (e.g., electronic device and/or associated solar cell component, etc.). The information or waves can include, for example, optical waves; information requests (e.g., a request for information regarding the characteristics associated with the electronic device or its solar cell component); captured, detected, or obtained information (e.g., image or other information representative of the electronic device or its solar cell component); a charging indicator that can indicate the electronic device is oriented properly in relation to the charger substrate component 510 (e.g., electronic device is oriented to have the solar cell component of the electronic device facing the charger substrate component 510) and/or is charging; a no-connection indicator that can indicate the electronic device is not oriented properly in relation to the charger substrate component 510 (e.g., electronic device is oriented such that the solar cell component of the electronic device is not facing the charger substrate component 510) and/or is not charging; etc.

The charger component 500 can comprise an aggregator component 504 that can aggregate data received (e.g., obtained) from various entities (e.g., detector component(s), electronic device(s), solar cell component(s), processor component(s), user interface(s), data store(s), etc.). The aggregator component 504 can correlate respective items of data based at least in part on type of data, source of the data, time or date the data was generated or received, electronic device associated with an item of data, etc., to facilitate processing of the data (e.g., analyzing of the data by the analyzer component 506).

The analyzer component 506 can analyze data (e.g., information detected by a detector component 512 or received by the communicator component 502) to facilitate determining or identifying the presence of an electronic device on or in proximity to the charger component 500 (e.g., the charger substrate component 510 of the charger component 500), and/or identifying the size, shape, position, and/or location of the electronic device in relation to the charger component 500 (e.g., the charger substrate component 510 of the charger component 500), and/or identifying the type or brand of the electronic device. The analyzer component 506 can provide analysis results relating to, for example, the charger controller component 508 or another component (e.g., processor component 520, data store 522, etc.).

Based at least in part on the results of this analysis, the charger component 500 (e.g., using the charger controller component 508) can control illumination of and/or switching states (e.g., on state, off state, idle state, sleep state, etc.) of respective light sources of the light source component 514 to facilitate efficiently providing (e.g., emitting or transmitting) optical waves to a solar cell component of the electronic device. The charger controller component 508 can employ the defined charging control algorithm to facilitate controlling operations (e.g., analyzing information relating to the charging of an electronic device(s); identifying the presence, size, shape, position, location, type, and/or brand, etc., of an electronic device(s); identify a wavelength or other characteristics associated with the electronic device; controlling illumination and/or wavelength of light sources (to facilitate charging an electronic device(s)); etc.) and components associated with the charger component 500, as more fully disclosed herein.

The charger substrate component 510 can be a substrate (e.g., plate, pad, etc.) that can be formed of a transparent material, such as, for example, glass or plastic, to facilitate allowing optical waves to pass through the charger substrate component 510 to an electronic device(s) associated with (e.g., placed on or in proximity to) the charger substrate component 510. For instance, the charger substrate component 510 can pass through light (e.g., optical waves) received from the light source component 514 via the optical processor component 516 to the electronic device(s) associated with the charger substrate component 510.

The detector component 512 can sense or detect a presence, size, shape, position, and/or location of an electronic device(s) in relation to the charger substrate component 510, and/or can sense or detect the type(s) or brand(s) of the electronic device(s). For instance, the detector component 512 can sense an electronic device in proximity to the charger substrate component 510 and can capture an image or other representative information of the electronic device. The detector component 512 can be, for example, a digital camera, a sensor, or other device that can sense or detect an object, such as an electronic device, and/or obtain (e.g., capture, receive, etc.) an image or information relating to the object.

The light source component 514 can comprise a plurality of light sources (e.g., LEDs, light bulbs, etc.) that can be illuminated to provide (e.g., emit or transmit) optical waves to an electronic device(s) associated with (e.g., on or in proximity to) the charger substrate component 510. The light sources of the light source component 514 can be arranged as a one-dimensional or multiple-dimensional array of light sources. The charger controller component 508 can control which light sources of the light source component 514 is/are to be illuminated at a given time to charge an electronic device(s). The charger controller component 508 also can control the wavelength of optical waves emitted from the light sources of the light source component 514 to correspond or at least substantially correspond to a wavelength associated with an electronic device(s) being charged by the charger component 500.

The charger component 500 can include an optical processor component 516 that can enhance operation of the charger component 500 to more efficiently provide optical waves to an electronic device(s) being charged by the charger component 500. The optical processor component 516 can utilize a holographic and/or an optical means to facilitate processing an optical wavefront associated with the light source component 514 to facilitate providing more efficient distribution of optical waves and conversion of optical waves to electrical energy. In some implementations, the optical processor component 516 can employ an array of lenticular lens or microlens that can expand coverage of each light source of the light source component 514 and enhance uniformity of the illuminated area of the charger substrate component 510.

The charger component 500 can include an indicator component 518 that can generate and provide indicators, or can identify received or detected indicators, to facilitate charging operations of the charger component 500. The indicator component 518 can generate a first type of indicator (e.g., a device-detected indicator) that can indicate that an electronic device has been detected on or in proximity to the charger substrate component 510. The indicator component 518 can generate a second type of indicator (e.g., a device-connected indicator) that can indicate that an electronic device is connected (e.g., via a wireless or wired connection) to the charger component 500. The indicator component 518 also can generate a third type of indicator (e.g., an orientation-error indicator) that can indicate that an electronic device and/or its solar cell component is or may not properly oriented in relation to the charger substrate component 510 (e.g., the solar cell component of the electronic device is not facing the charger substrate component 510), and/or can prompt a user to re-orient the electronic device to have its solar cell component face the charger substrate component 510. The indicator component 518 can generate a fourth type of indicator (e.g., a charge level indicator) that can indicate a charging level or status (e.g., fully charged, partially charged, drained) of an electronic device associated with the charger component 500, for example, in response to information relating to a charging level or status that is detected from the electronic device by the detector component 512 or received from the electronic device by the communicator component 502. The indicator component 518 can facilitate presentation (e.g., display, audible broadcast, vibration, etc.) of a generated indicator(s), for example, via an interface(s) (not shown in FIG. 5; e.g., as described in relation to FIGS. 6 and 10) associated with the charger component 500 and/or via the electronic device (e.g., a message comprising an indicator(s) can be transmitted to the electronic device for presentation).

In some implementations, the indicator component 518 can identify an indicator(s) received from an electronic device by the communicator component 502 or detected from the electronic device by the detector component 512. For instance, the indicator component 518 can identify a fifth type of indicator (e.g., a charge level indicator), which can indicate a charging level or status (e.g., fully charged, partially charged, drained) of an electronic device associated with the charger component 500, wherein the fifth type of indicator is received or detected by the charger component 500. In response, the indicator component 518 can generate the fourth type of indicator, which can indicate the charging level or status of the electronic device, and the fourth type of indicator can be presented via the interface(s) associated with the charger component 500.

In some implementations, if the charger controller component 508 identifies that an electronic device being charged by the charger component 500 is fully charged, the charger controller component 508 can control the subset of light sources of the light source component 514 being used to charge the electronic device to switch the subset of light sources off or otherwise transition the subset of light sources from an illuminated state to a non-illuminated state. This can further save energy and/or reduce potential light contamination to the surrounding environment that may be caused by unnecessary illumination of light sources.

The charger component 500 also can include a processor component 520 that can operate in conjunction with the other components (e.g., communicator component 502, aggregator component 504, analyzer component 506, charger controller component 508, etc.) to facilitate performing the various functions of the charger component 500. The processor component 520 can employ one or more processors, microprocessors, or controllers that can process data, such as information relating to charging electronic devices, data relating to parameters associated with the charger component 500 and associated components, etc., to facilitate efficiently charging electronic devices on or in proximity to the charger component 500; and can control data flow, optical waves emissions, and/or data or image capture between the charger component 500 and other components associated with the charger component 500.

In yet another aspect, the charger component 500 can contain a data store 522 that can store data structures (e.g., user data, metadata); code structure(s) (e.g., modules, objects, classes, procedures), commands, or instructions; information relating to charging of electronic devices; parameter data; algorithms (e.g., defined charging control algorithm, defined electronic-device detection algorithm, etc.); defined charging control criterion(s); and so on. In an aspect, the processor component 520 can be functionally coupled (e.g., through a memory bus) to the data store 522 in order to store and retrieve information desired to operate and/or confer functionality, at least in part, to the communicator component 502, aggregator component 504, analyzer component 506, charger controller component 508, etc., and/or substantially any other operational aspects of the charger component 500. It is to be appreciated and understood that the various components of the charger component 500 can communicate information between each other and/or between other components associated with the charger component 500 as desired to carry out operations of the charger component 500. It is to be further appreciated and understood that respective components (e.g., communicator component 502, aggregator component 504, analyzer component 506, charger controller component 508, etc.) of the charger component 500 each can be a stand-alone unit, can be included within the charger component 500 (as depicted), can be incorporated within another component of the charger component 500 (e.g., charger controller component 508) or component separate from the charger component 500, and/or virtually any suitable combination thereof, as desired.

Figure 6:
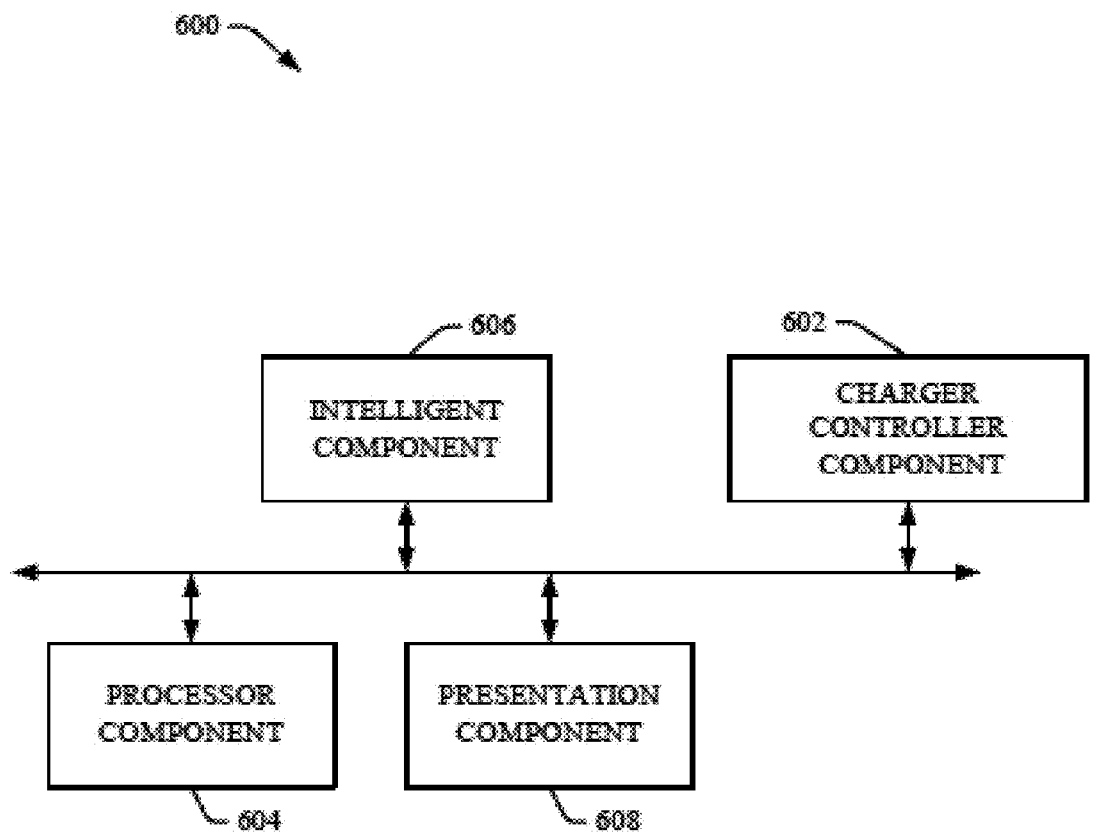
FIG. 6 presents a block diagram of a system that can employ intelligence to facilitate efficiently charging electronic devices, in accordance with an embodiment of the disclosed subject matter.

Referring to FIG. 6, depicted is a block diagram of a system 600 that can employ intelligence to facilitate efficiently charging electronic devices, in accordance with an embodiment of the disclosed subject matter. The system 600 can be employed by a charger component to efficiently and intelligently control charging of electronic devices associated with the charger component.

The system 600 can include a charger controller component 602 that can desirably (e.g., efficiently and intelligently) control charging electronic devices using optical waves, as more fully disclosed herein. It is to be appreciated that the charger controller component 602 can be the same or similar as respective components (e.g., respectively named components), and/or can contain the same or similar functionality as respective components, as more fully described herein.

The system 600 can further include a processor component 604 that can be associated with (e.g., communicatively connected to) the charger controller component 602 and/or other components (e.g., components of system 600) via a bus. In accordance with an embodiment of the disclosed subject matter, the processor component 604 can be an applications processor(s) that can manage communications and run applications. For example, the processor component 604 can be a processor that can be utilized by a computer, mobile computing device, or other electronic computing device. The processor component 604 can generate commands in order to facilitate controlling charging of electronic devices associated with the charger controller component 602, modifying parameters associated with the charger controller component 602 or other components of the charger component, etc.

The system 600 also can include an intelligent component 606 that can be associated with (e.g., communicatively connected to) the charger controller component 602, the processor component 604, and/or other components associated with system 600 to facilitate analyzing data, such as current and/or historical information, and, based at least in part on such information, can make an inference(s) and/or a determination(s) regarding, for example, the presence, size, shape, position (e.g., orientation), and/or location of an electronic device in relation to a charger substrate component of the charger component, and/or the type or brand of the electronic device; which light source(s) of a light source component is/are to be illuminated to charge an electronic device associated with the charger component; charging characteristics associated with an electronic device (e.g., characteristics indicating a suitable wavelength to use for charging an electronic device); charging state of an electronic device; charging level (e.g., fully charged, partially charged, completely drained) of an electronic device; setting of parameters associated with the charger controller component 602 and associated components, etc. For example, based in part on current and/or historical evidence, the intelligent component 606 can infer that a specified subset of light sources are to be illuminated to charge an electronic device located on or in proximity to the charger component, and/or a light wavelength to be used by the specified subset of light sources, to intelligently and efficiently charge the electronic device.

In an aspect, the intelligent component 606 can communicate information related to the inferences and/or determinations to the charger controller component 602. Based at least in part on the inference(s) or determination(s) with respect to such data by the intelligent component 606, the charger controller component 602 can take (e.g., automatically or dynamically take) one or more actions to facilitate intelligently and efficiently charging the electronic device associated with the charger component, etc.

It is to be understood that the intelligent component 606 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 600 also can include a presentation component 608, which can be connected with the processor component 604. The presentation component 608 can provide various types of user interfaces to facilitate interaction between a user and any component coupled to the processor component 604. As depicted, the presentation component 608 is a separate entity that can be utilized with the processor component 604 and associated components. However, it is to be appreciated that the presentation component 608 and/or similar view components can be incorporated into the processor component 604 and/or a stand-alone unit. The presentation component 608 can provide one or more graphical user interfaces (GUIs) (e.g., touchscreen GUI), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor component 604.

The user can also interact with the regions to select and provide information via various devices such as a mouse, a roller ball, a keypad, a keyboard, a touchscreen, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In accordance with one embodiment of the disclosed subject matter, a charger component (e.g., 102, 202, 302, 402, 500) and/or other components, can be situated or implemented on a single integrated-circuit chip. In accordance with another embodiment, a charger component (e.g., 102, 202, 302, 402, 500), and/or other components, can be implemented on an ASIC chip. In yet another embodiment, a charger component (e.g., 102, 202, 302, 402, 500) and/or other components, can be situated or implemented on multiple dies or chips.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 7:
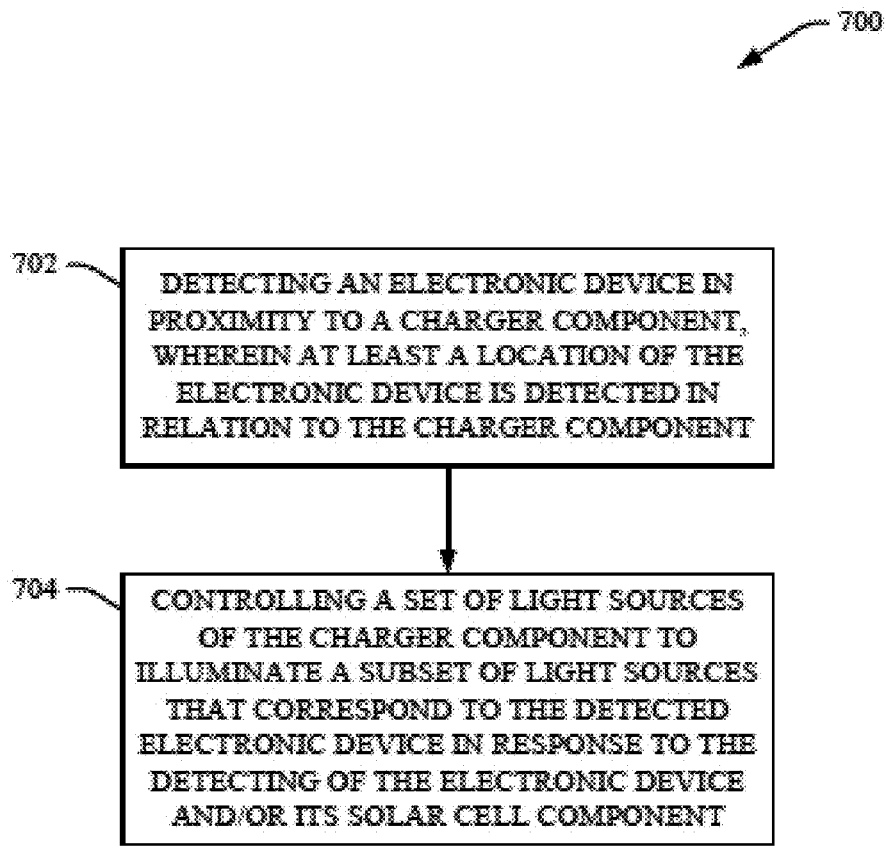
FIG. 7 illustrates a flow diagram of an example method for efficiently charging electronic devices, in accordance with various embodiments and aspects of the disclosed subject matter.
Figure 8:
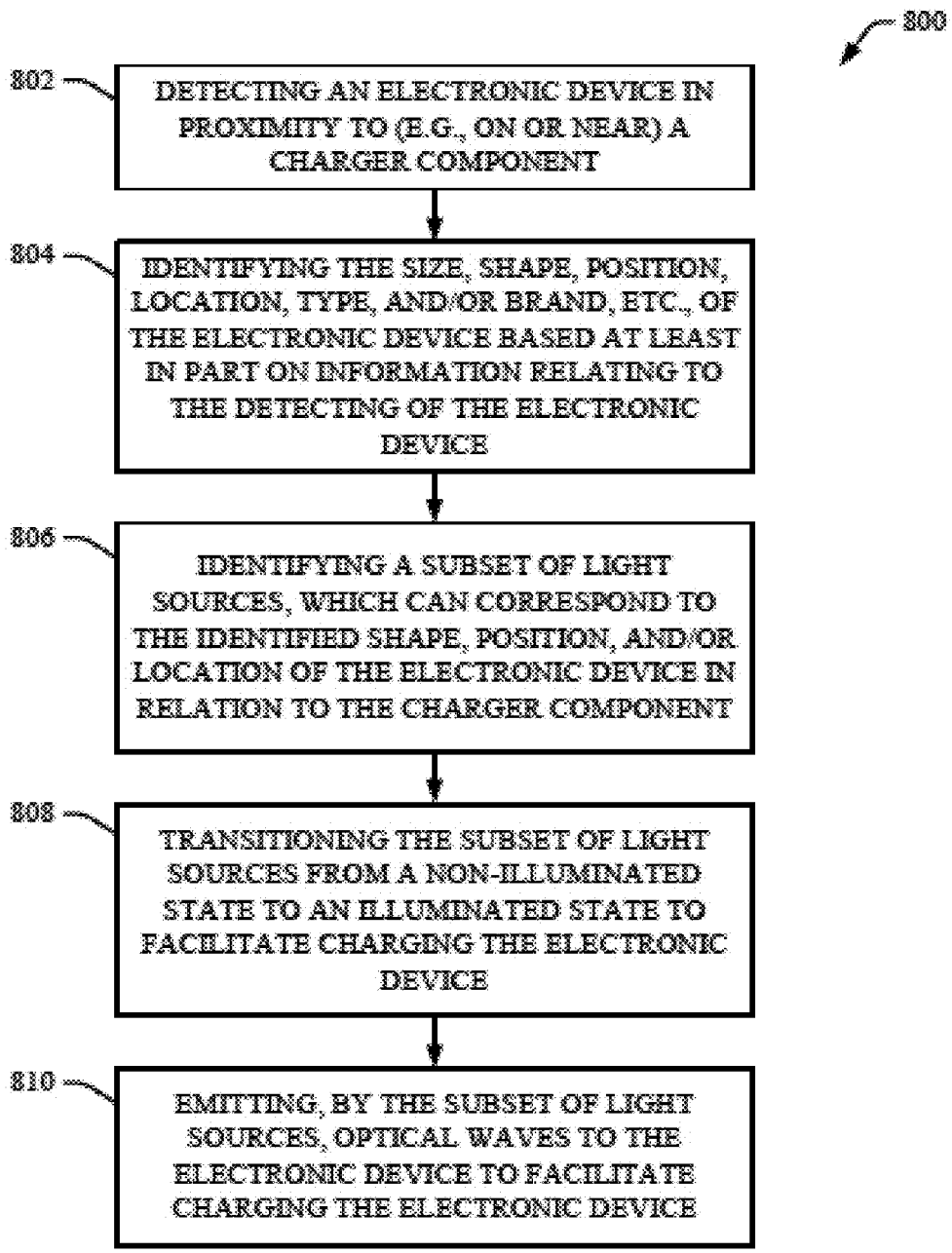
FIG. 8 depicts a flow diagram of another example method for efficiently charging electronic devices, in accordance with various embodiments and aspects of the disclosed subject matter.
Figure 9:
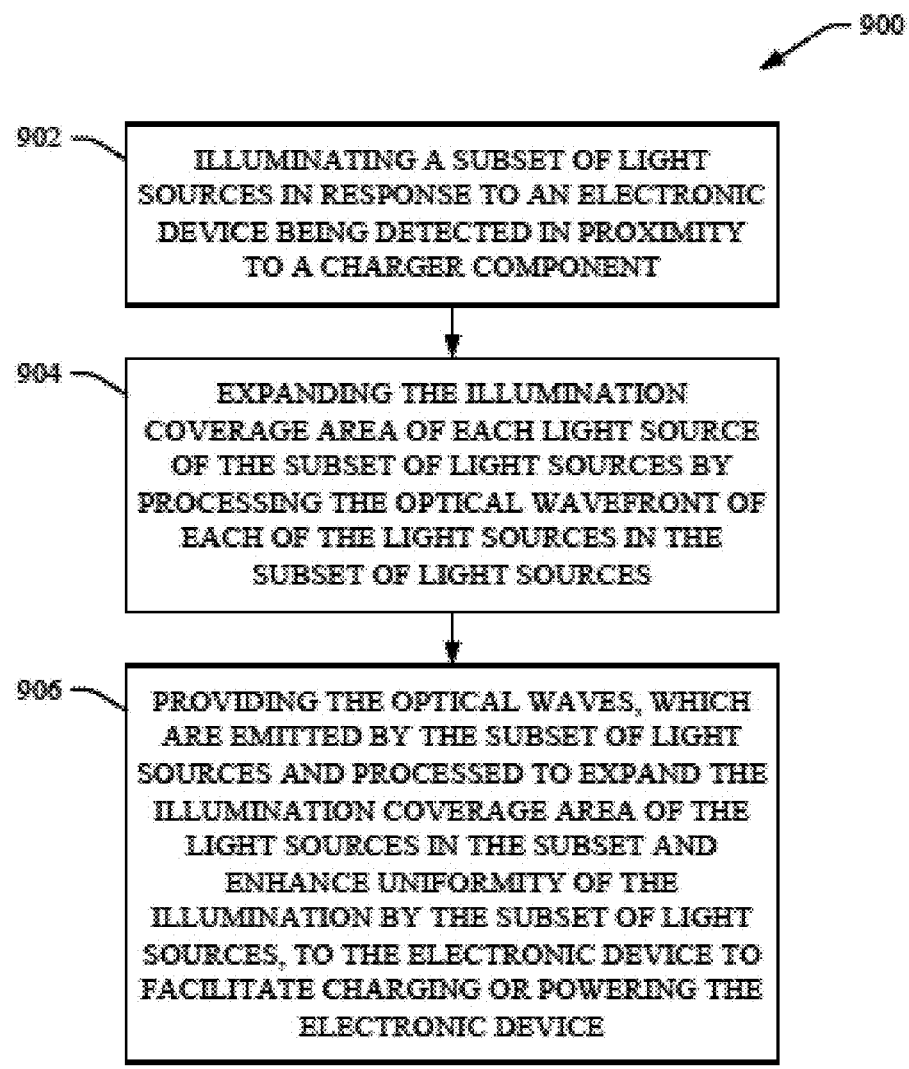
FIG. 9 illustrates a flow diagram of another example method for efficiently charging electronic devices, in accordance with various embodiments and aspects of the disclosed subject matter.

FIGS. 7-9 illustrate methods and/or flow diagrams in accordance with the disclosed subject matter. For simplicity of explanation, the methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

Referring to FIG. 7, illustrated is a flow diagram of an example method 700 for efficiently charging (e.g., wirelessly charging) electronic devices, in accordance with various embodiments and aspects of the disclosed subject matter. At 702, an electronic device can be detected in proximity to a charger component, wherein at least a location of the electronic device can be detected in relation to the charger component. The charger component can include a detector component that can sense or detect an electronic device in proximity to (e.g., on or near) a charger substrate component of the charger component, as more fully disclosed herein. The detector component can detect the presence, size, shape, position, and/or location of the electronic device and/or its solar cell component in relation to the charger substrate component of the charger component, and/or can detect the type or brand of the electronic device.

At 704, a set of light sources of the charger component can be controlled to illuminate a subset of light sources that correspond to the detected electronic device in response to the detecting of the electronic device and/or its solar cell component, wherein the subset of light sources comprises a portion of the set of light sources. The charger component can include a charger controller component that can control the light sources of the light source component to illuminate the subset of light sources that correspond to the size, shape, position, and/or location of the electronic device, or its solar cell component, in relation to the charger substrate component, and/or correspond to the type or brand of the electronic device or its solar cell component, while maintaining other light sources of the set of light sources in an non-illuminated stated. For instance, the charger controller component can select and/or switch on a subset of light sources that can illuminate a charging coverage area on the charger substrate component that can correspond to the size, shape, position, location, type, and/or brand, etc., of the electronic device, or its solar cell component, without having to switch on other light sources of the light source component that are associated with areas of the charger substrate component that are outside the charging coverage area.

Turning to FIG. 8, depicted is a flow diagram of another example method 800 for efficiently charging electronic devices, in accordance with various embodiments and aspects of the disclosed subject matter. At 802, an electronic device can be detected in proximity to (e.g., on or near) a charger component. The charger component can include a detector component that can sense or detect the presence, size, shape, position, and/or location of the electronic device and/or its solar cell component in relation to the charger substrate component of the charger component, and/or can identify the type or brand of the electronic device or solar cell component.

At 804, the size, shape, position, location, type, and/or brand, etc., of the electronic device can be identified based at least in part on information relating to the detecting of the electronic device. For instance, the detector component can obtain (e.g., detect, receive, etc.) or generate information, such as an image of the electronic device (or its solar cell component) or information representative of the electronic device (or its solar cell component) in relation to the charger substrate component. The charger controller component of the charger component can identify the size, shape, position, and/or location of the electronic device and/or its solar cell component in relation to the charger substrate component, and/or can identify the type or brand of the electronic device (or its solar cell component), based at least in part on an analysis of the obtained or generated information.

At 806, a subset of light sources, which can correspond to the identified shape, position, and/or location of the electronic device in relation to the charger component, can be identified. The charger component can include a light source component comprising a set of light sources that can be used to provide (e.g., emit) optical waves to the electronic device (e.g., the solar cell component of the electronic device) to facilitate charging the electronic device. The charger controller component can identify a charging coverage area of the charger substrate component and/or a subset of light sources of the set of light sources that can correspond to the size shape, position, location, type, and/or brand, etc., of the electronic device or its solar cell component in relation to the charger substrate component. The charger controller component can control illumination of the subset of light sources to illuminate the charging coverage area to facilitate charging the electronic device.

At 808, the subset of light sources can transition from a non-illuminated state to an illuminated state to facilitate charging the electronic device. The charger controller component can transition (e.g., switch) the subset of light sources from the non-illuminated state to the illuminated state to facilitate charging the electronic device, while maintaining other light sources (e.g., not associated with an electronic device being charged by the charger component) in a non-illuminated state.

At 810, the subset of light sources can emit optical waves to the electronic device to facilitate charging the electronic device. The subset of light sources can generate optical waves that can be emitted to the solar cell component of the electronic device. In some implementations, an optical processor component can enhance the optical waves emitted by the subset of light sources to expand the coverage area and improve uniformity of the optical waves, which can be presented to the solar cell component of the electronic device via the charger substrate component. The solar cell component of the electronic device can receive the optical waves and can convert the optical waves to electrical energy to charge a power component (e.g., a battery) of the electronic device and/or otherwise provide power to the electronic device.

FIG. 9 illustrates a flow diagram of another example method 900 for efficiently charging electronic devices, in accordance with various embodiments and aspects of the disclosed subject matter. At 902, a subset of light sources can be illuminated in response to an electronic device being detected in proximity to a charger component. The charger controller component can control illumination of a set of light sources to illuminate a subset of light sources of the set that are located in an area of the light source component that corresponds to the position, shape, size, and/or location of the electronic device in relation to (e.g., on or near) the charger substrate component of the charger component, and/or corresponds to the type or brand of the electronic device.

At 904, the illumination coverage area of each light source of the subset of light sources can be expanded by processing the optical wavefront of each of the light sources in the subset of light sources. The optical processor component can utilize a holographic and/or an optical means (e.g., static or dynamic optical and/or holographic devices) to facilitate processing an optical wavefront of the light sources in the subset to facilitate providing more efficient distribution of optical waves and conversion of optical waves to electrical energy. In some implementations, the optical processor component can employ an array of lenticular lens or microlens that can expand coverage of each light source of the subset and enhance uniformity of the illuminated area of the charger substrate component.

The charger controller component can take into account the expansion of the illumination coverage area of the light sources in the subset when determining which light sources and the number of light sources to include in the subset of light sources to be illuminated to facilitate charging the electronic device. For example, the charger controller component can have information indicating the size of the illumination coverage area of each light source in relation to the charger substrate component after processing of the optical wavefront of the respective light sources by the optical processor component, and can determine which light sources and the number of light sources to switch to the on state based at least in part on the respective illumination coverage areas of the respective light sources after processing by the optical processor component and the position, shape, size, and/or location of the electronic device in relation to the charger substrate component.

At 906, the optical waves, which are emitted by the subset of light sources and processed to expand the illumination coverage area of the light sources in the subset and enhance uniformity of the illumination by the subset of light sources, can be provided to the electronic device to facilitate charging or powering the electronic device. The optical waves generated and emitted by the subset of light sources, as processed by the optical processor component to expand the illumination coverage area of those light sources, can be provided to the electronic device via the charger substrate component of the charger component.

The solar cell component of the electronic device can receive such optical waves from the charger component. The solar cell component can process these optical waves to convert the optical waves to electrical energy to facilitate charging a power component (e.g., a rechargeable battery) of the electronic device and/or otherwise provide power to the electronic device.

Figure 10:
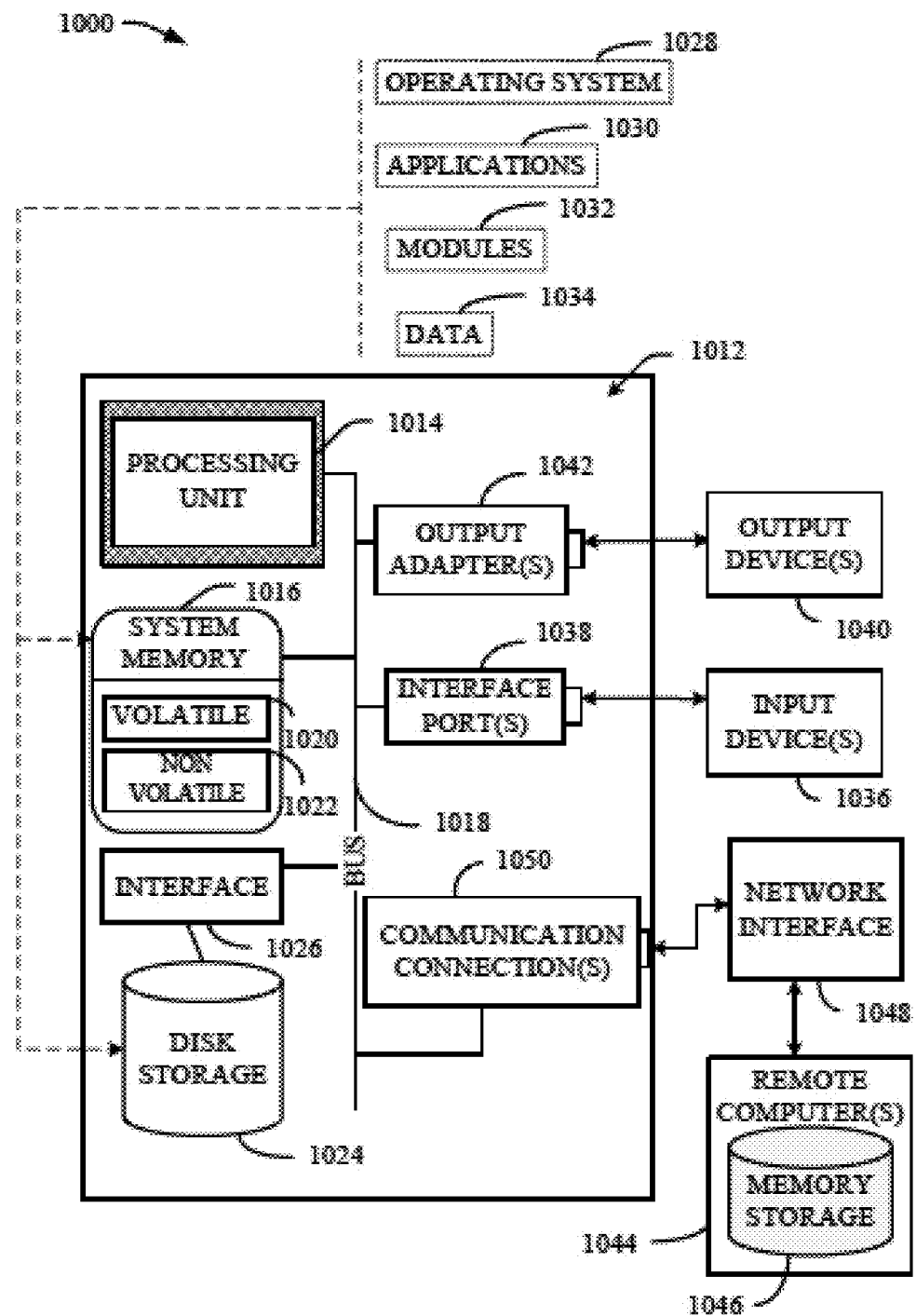
FIG. 10 is a schematic block diagram illustrating a suitable operating environment.
Figure 11:
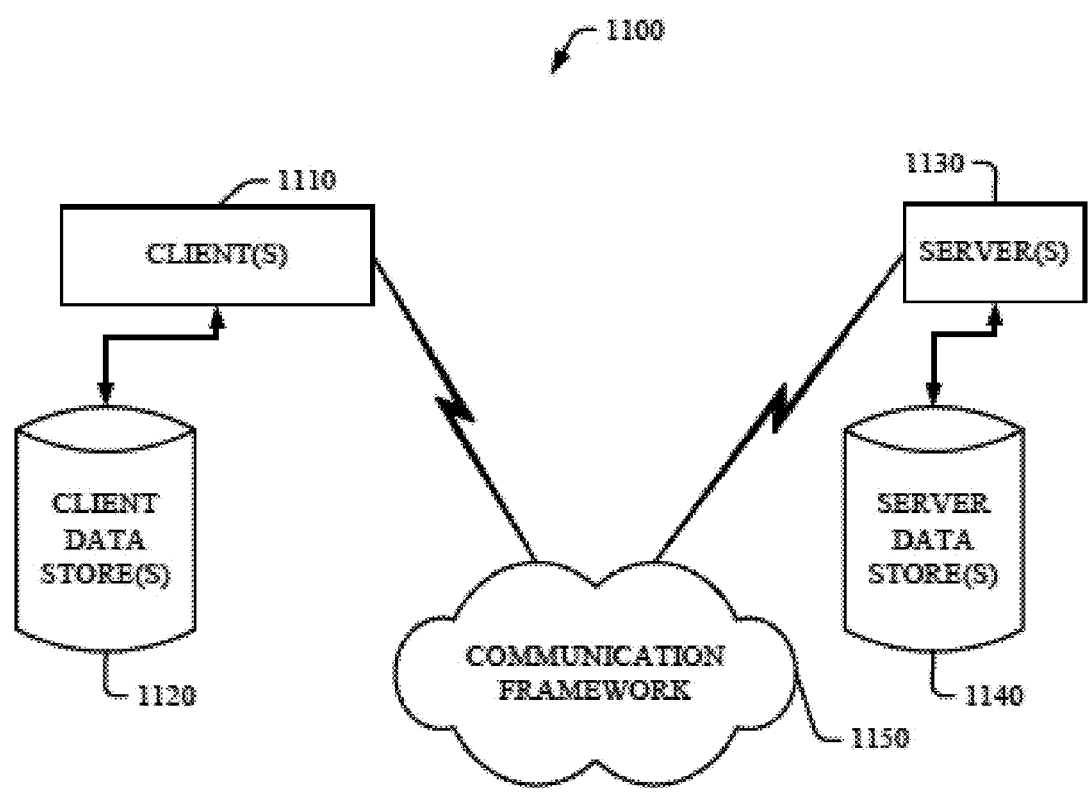
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject disclosure also may be implemented in combination with other program modules. Generally, program modules include routines, programs, components, data structures, etc. that perform particular tasks and/or implement particular abstract data types. Moreover, those skilled in the art will appreciate that the methods may be practiced with other computer system configurations, including single-processor or multiprocessor computer systems, mini-computing devices, mainframe computers, as well as personal computers, hand-held computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the subject disclosure can be practiced on stand-alone computers. In a distributed computing environment, program modules may be located in both local and remote memory storage devices.

With reference to FIG. 10, a suitable environment 1000 for implementing various aspects of the claimed subject matter includes a computer 1012. The computer 1012 includes a processing unit 1014, a system memory 1016, and a system bus 1018. It is to be appreciated that the computer 1012 can be used in connection with implementing one or more of the systems or components (e.g., charger component, detector component, charger substrate component, charger controller component, light source component, optical processor component, etc.) shown and/or described in connection with, for example, FIGS. 1-6. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also can include removable/non-removable, volatile/non-volatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026).

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 with which the subject disclosure can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing the subject disclosure, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1120 that can be employed to store information local to the client(s) 1110. Similarly, the server(s) 1130 are operatively connected to one or more server data store(s) 1140 that can be employed to store information local to the servers 1130.

It is to be appreciated and understood that components (e.g., charger component, detector component, charger substrate component, charger controller component, light source component, optical processor component, etc.), as described with regard to a particular system or method, can include the same or similar functionality as respective components (e.g., respectively named components or similarly named components) as described with regard to other systems or methods disclosed herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As utilized herein, terms "component," "system," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein can encompass a computer program accessible from any computer-readable device, carrier, or media. For example, computer readable media can include, but is not limited to, magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the disclosed subject matter.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a graphics processing unit (GPU), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
  at least one memory that stores computer executable components; and
  at least one processor that facilitates execution of the computer executable components stored in the at least one memory, the computer executable components, comprising:
    a detector component that detects an electronic device in response to the electronic device being in proximity to a charger substrate component of a charger component, wherein the detector component determines a type or a brand of the electronic device based at least in part on a tag or a code associated with the electronic device that is detected from the electronic device;
    a charger controller component that identifies a charging coverage area of the charger substrate component that corresponds to at least a location of the electronic device in relation to the charger substrate component and controls a set of light sources of the charger component to facilitate illumination of a subset of light sources of the set of light sources associated with the charging coverage area, based at least in part on the location of the electronic device in relation to the charger substrate component and the type or the brand of the electronic device, to facilitate charging or powering the electronic device; and
    an optical processor component that employs a set of lenticular lenses associated with the set of light sources, wherein the set of lenticular lenses processes an optical wavefront of light sources of the subset of light sources and expands an illumination coverage area of the subset of light sources, based at least in part on the processing of the optical wavefront, to facilitate reducing a number of light sources in the subset of light sources used to cover the charging coverage area as compared to a larger number of light sources that would otherwise be employed by the system to cover the charging coverage area without the set of lenticular lenses, and wherein the larger number is larger than the number.

2. The system of claim 1, wherein the subset of light sources are illuminated to facilitate emission of optical waves that encompass all or at least substantially all of the charging coverage area of the charger substrate component.

3. The system of claim 1, wherein the optical processor component expands the illumination coverage area of light sources of the subset of light sources to facilitate emission of optical waves that encompass all or at least substantially all of the charging coverage area of the charger substrate component.

4. The system of claim 1, wherein the set of lenticular lenses expands the illumination coverage area of the subset of light sources to enable an amount of space between adjacent light sources of the subset of light sources to be increased by a defined amount as compared to a smaller amount of space between the adjacent light sources that would have been implemented without use of the set of lenticular lenses with the subset of light sources in connection with illumination of the illumination coverage area.

5. The system of claim 1, wherein the optical processor component comprises at least one of an optical device or a holographic device.

6. The system of claim 1, wherein the detector component detects at least one of a size, a position, a shape, or a location of the electronic device in relation to the charger substrate component, or detects the type of electronic device or the brand associated with the electronic device based at least in part on the tag or the code associated with the electronic device.

7. The system of claim 6, wherein the detector component comprises an image capture device that captures an image of the electronic device to produce information representative of the size, the position, the shape, the location, the type, or the brand of the electronic device, in response to the electronic device being in proximity to the charger substrate component.

8. The system of claim 7, wherein the charger controller component identifies at least one of the size, the position, the shape, or the location of at least one of the electronic device or a solar cell component of the electronic device, to facilitate the identification of the charging coverage area of the charger substrate component.

9. The system of claim 1, wherein the charger controller component identifies the subset of light sources based at least in part on the identification of the charging coverage area of the charger substrate component.

10. The system of claim 1, wherein the electronic device includes a solar cell component that receives optical waves from the subset of light sources and converts the optical waves to electrical energy to charge or power the electronic device.

11. A method, comprising:
    detecting, by a system including a processor, an electronic device in response to the electronic device being in proximity to a charger substrate component of a charger component;
    identifying, by the system, a type or a brand of the electronic device based at least in part on a tag or a code associated with the electronic device that is detected from the electronic device as a result of the detecting;
    controlling, by the system, a set of light sources of the charger substrate component to facilitate illuminating a subset of light sources of the set of light sources associated with a charging coverage area of the charger substrate component that corresponds to a location of the electronic device in relation to the charger substrate component, based at least in part on the location of the electronic device in relation to the charger substrate component and the type or the brand of the electronic device, to facilitate charging or powering the electronic device; and
    expanding, by the system, an illumination coverage area of the subset of light sources, via use of a set of lenticular lenses, to facilitate reducing a number of light sources in the subset of light sources used to cover the charging coverage area as compared to a second number of light sources that would otherwise be employed by the system to cover the charging coverage area without the set of lenticular lenses, wherein the second number is larger than the number.

12. The method of claim 11, further comprising:
    illuminating, by the system, the subset of light sources to facilitate emitting optical waves that cover all or at least substantially all of the charging coverage area.

13. The method of claim 11, wherein the expanding further comprises expanding the illumination coverage area of light sources of the subset of light sources to facilitate emitting optical waves that cover all or at least substantially all of the charging coverage area.

14. The method of claim 11, further comprising:
    detecting, by the system, at least one of a size, a position, or a shape of the electronic device, and the location of the electronic device, in relation to the charger substrate component.

15. The method of claim 14, further comprising:
    at least one of capturing, by the system, an image of the electronic device or sensing, by the system, the electronic device to produce information representative of at least one of the size, the position, the shape, or the location of the electronic device;
    identifying, by the system, at least one of the size, the position, the shape, or the location of the electronic device to facilitate identifying the charging coverage area; and
    identifying, by the system, the charging coverage area.

16. The method of claim 15, further comprising:
    identifying, by the system, the subset of light sources in response to the identifying of the charging coverage area.

17. The method of claim 11, further comprising:
    emitting, by the system, optical waves that cover all or at least substantially all of the charging coverage area.

18. The method of claim 17, further comprising:
    receiving, by the system, the optical waves;
    converting, by the system, the optical waves to electrical energy;
    providing, by the system, the electrical energy to charge a power component associated with the electronic device or power the electronic device.

19. A non-transitory computer readable storage medium comprising computer executable instructions that, in response to execution, cause a system including a processor to perform operations, comprising:
    sensing an electronic device in response to the electronic device being in proximity to a charger substrate component of a charger component;
    determining a type or a brand of the electronic device based at least in part on a tag or a code associated with the electronic device that is sensed from the electronic device during the sensing;
    controlling a set of light sources to facilitate illuminating a subset of light sources of the set of light sources associated with a charging coverage area of the charger substrate component that is associated with a location of the electronic device in relation to the charger substrate component, based at least in part on the location of the electronic device in relation to the charger substrate component and the type or the brand of the electronic device, to facilitate charging or powering the electronic device; and
    enlarging, via use of a set of lenticular lenses, an illumination coverage area of the subset of light sources to facilitate decreasing a number of light sources in the subset of light sources used to cover the charging coverage area as compared to a different number of light sources that would otherwise be employed by the charger component to cover the charging coverage area without use of the set of lenticular lenses with the subset of light sources, wherein the different number is larger than the number.

20. The non-transitory computer readable storage medium of claim 19, wherein the operations further comprise:
    identifying at least one of a size, a position, a shape, or a location of at least one of the electronic device or a solar cell component of the electronic device, to facilitate identifying the charging coverage area of the charger substrate component.

21. A system, comprising:
means for detecting an electronic device in response to the electronic device being in proximity to a charger substrate component of a charger component;
means for determining a type or a brand of the electronic device based at least in part on a tag or a code associated with the electronic device that is detected from the electronic device by the means for detecting;
means for controlling a set of light sources to facilitate illuminating a subset of light sources of the set of light sources associated with a charging coverage area of the charger substrate component that corresponds to a location of the electronic device in relation to the charger substrate component, based at least in part on the location of the electronic device in relation to the charger substrate component and the type or the brand of the electronic device, to facilitate charging or powering the electronic device; and
means for expanding an illumination coverage area of the subset of light sources, via use of a set of lenticular lenses, to facilitate reducing a number of light sources in the subset of light sources used to cover the charging coverage area as compared to a second number of light sources that would have been employed by the charger component to cover the charging coverage area without use of the set of lenticular lenses, wherein the second number is larger than the number.

22. The system of claim 21, further comprising:
means for identifying at least one of a size, a position, a shape, the location, the type, or the brand associated with at least one of the electronic device or a solar cell component of the electronic device, to facilitate identifying the charging coverage area of the charger substrate component.

* * * * *